3,341,471
ATTRITION RESISTANT SOLID CATALYSTS
James L. Callahan and Warren R. Knipple, Bedford, Ohio, assignors to The Standard Oil Company, Cleveland, Ohio, a corporation of Ohio
No Drawing. Filed May 9, 1963, Ser. No. 279,308
14 Claims. (Cl. 252—451)

The present invention relates to a process for preparing solid antimony-containing catalysts of improved mechanical strength and more particularly pertains to a novel process for preparing antimony oxide containing catalysts of improved attrition resistance and to the novel improved catalysts resulting from this process.

The catalysts embodied in the present invention are antimony oxide containing oxidation catalysts and particularly catalysts composed of an antimony oxide in combination with at least one member selected from the group consisting of the oxides of uranium iron, manganese, thorium, cerium, molybdenum and tin. Catalysts of this type are known to be useful in the oxidation of olefins to oxygenated hydrocarbons, the oxidation of olefin-ammonia mixtures to unsaturated nitriles as well as the oxidative dehydrogenation of monoolefins to diolefins and olefins to aromatic compounds. For instance, the foregoing catalysts are useful in the oxidation of propylene to acrolein, isobutylene to methacrolein, propylene-ammonia to acrylonitrile, isobutylene-ammonia to methacrylonitrile, butene-1 or butene-2 to butadiene-1,3, and the like as is more fully disclosed in U.S. Patent No. 2,904,580 and copending U.S. patent applications of James L. Callahan, Berthold Gertisser and Joseph J. Szabo, Ser. No. 190,038, filed Apr. 25, 1962, now Patent No. 3,248,340; James L. Callahan and Berthold Gertisser, Ser. Nos. 230,741 now Patent No. 3,264,225, 230,717, now Patent No. 3,200,084, and 230,684 filed Oct. 15, 1962, now Patent No. 3,200,081; Ser. Nos. 201,329, now abandoned, and 201,321, now abandoned, filed June 11, 1962; James J. Callahan, Berthold Gertisser and R. Grasselli, Ser. No. 201,330, filed June 11, 1962, now Patent No. 3,260,768; James L. Callahan, Berthold Gertisser and R. Graselli, Ser. Nos. 230,694, now Patent No. 3,257,474, and 230,742, filed Oct. 15, 1962, now Patent No. 3,251,-900; J. L. Callahan and Berthold Gertisser, Ser. Nos, 247,331, now Patent No. 3,198,750 and 250,008 filed Dec. 26, 1962 and Jan. 8, 1963, respectively; and in British Patent No. 876,446.

The nature of the chemical compounds or mixtures which compose the catalysts of the present invention is not known with any degree of certainty. The catalyst, exemplified for illustrative purposes by an antimony oxide-uranium oxide mixture, may be a mixture of antimony oxide or oxides and uranium oxide or oxides. It is also possible that the antimony and uranium are combined with the oxygen to form an antimonate or uranate. The proportion of antimony to the one or more other specified metal oxides in the preferred catalyst systems may vary greatly. The Sb:M atomic ratio wherein M is at least one metal selected from the group consisting of uranium, iron, manganese, thorium, cerium, molybdenum and tin, can range from about 1:50 to about 99:1. However, optimum activity appears to be obtained at Sb:M atomic ratios within the range of from 1:1 to 25:1.

All of the antimony oxide catalysts of the foregoing types are preferably activated by thermal treatments in an oxygen-containing gas such as air or oxygen at a temperature in excess of about 1000° F. Whatever the method employed in the preparation of the combination of antimony oxide with one or more of the metal oxides mentioned above, the final catalyst after activation at a temperature in excess of about 1000° F. is found to be very soft and in general has poor mechanical strength. Even when an active or inert support material such as silica sol or silica gel is incorporated into the catalyst mass prior to thermal activation, the finished catalyst is found to be generally poor in physical properties, particularly in resistance to attrition. It is believed that this condition results because of crystal lattice rearrangement upon thermal treatments, either in the antimony oxide itself or in a compound which may be formed by reaction of antimony oxide with the other metal oxide component.

Some antimony oxide catalysts, particularly antimony oxide-uranium oxide and antimony oxide-iron oxide, are believed to form an open type of crystal structure when they are activated at temperatures in excess of about 1000° F. This open type of crystal structure is believed to be formed by a solid state reaction between the antimony oxide and the other metal oxide component which make up the active system. The optimum calcination temperature at which this solid state reaction proceeds has been found to be in the range from about 100° F. to about 2000° F., the exact optimum depending on the particular catalyst formulation. When a catalyst support, such as silica gel, is incorporated in the metal oxide catalyst slurry, it has been found to be relatively ineffective for imparting mechanical strength to the resulting catalyst. The lattice expansion of the more dense antimony oxide-other metal oxide component to form the new structure destroys the catalyst particle strength. Thus, if the metal oxide catalyst slurry including the silica gel support material is shaped in the form of an extrusion and is dried and calcined at an elevated temperature, the resulting extrusion is extremely soft with little mechanical strength.

Surprisingly, it has been found that physically durable oxidation catalysts comprising antimony oxide may be prepared by forming the active catalyst components, such as antimony oxide-uranium oxide, activating this combination of oxides in an oxidizing atmosphere at a temperature in excess of at least about 1000° F. up to about 2000° F., reducing the resulting activated metal oxide combination to a fine powder, preferably to pass through a screen of 35 mesh or finer, mixing this fine active component powder with a silica sol, forming a paste or slurry, finally drying and subjecting the dried material to a second and final heat treatment at a temperature of at least about 750° F. and as high as 2000° F. Although silica is the preferred carrier in this invention, other carriers including metal phosphates such as boron phosphate, aluminum phosphate, zirconium phosphate and the like may be used. In the process of this invention and aqueous silica suspension, dispersion, sol or gel is preferred. Silica sols derived from water glass, silicon halides, and silicates are all useful in the preparation of the attrition resistant catalysts embodied herein. The silica sols useful herein may contain as little as 5% by weight or less up to 90% by weight or more of silica, the main requirement being that there be some water present.

In accordance with the present invention it may be desirable to shape the catalyst in suitable forms for use in a fixed bed or a fluid bed reactor while it is in the form of a paste or slurry just prior to the finaly drying and thermal treatment. This can be accomplished in any ample, if the material is in the form of a paste, the of several ways which are well known in the art, for excatalyst may be extruded; if it is in the form of a slurry, spray drying or formation of microspheroidal spheres in oil techniques may be utilized. When extrusion or oil-drop techniques are used, the resulting shaped catalyst particles would normally be dried and thermally treated at a temperature in excess of about 750° F. In cases where spray drying is employed in the shaping of the catalyst in microspheroidal form, the shaping operation and drying are accomplished in a single step and it is only necessary to activate thermally the catalyst at a temperature in excess of about 750° F.

The preferred method of preparing an attrition resistant catalyst exemplified by a mixed oxide of antimony-uranium is as follows:

(a) Hydrous antimony oxide and uranyl nitrate or a uranium oxide are combined with nitric acid and a silica sol. A volatile base such as ammonium hydroxide is then added until the pH is above about 5 and preferably is about 8.

(b) The slurry from (a) can be filtered and washed to remove some of the ammonium nitrate which is present. Otherwise, the slurry can be dried directly by such procedures as spray drying or tray drying in an oven.

(c) The dried solid from (b) is then heat treated or calcined in an oxidizing atmosphere at a temperature in the range of from about 800° F. to about 2000° F. In some instances it may be advantageous to heat treat the dried solid in two or more stages, for example, for several hours at 800° F. followed by heat treatment for several additional hours at about 1700° F.

(d) The calcined solid can then be ground to a fine powder by any suitable size reduction process, for instance, ball milling either wet or dry, attrition milling, or hammer milling may be employed. If it is desired to produce a catalyst for fixed bed operation by extrusion, it is preferred to grind the solid to a particle size such that the average particle will be about $\frac{1}{10}$ or less the diameter of the extrudate. In one instance the powder is mixed with sufficient silica sol or wet silica gel to produce a paste with the proper consistency for extrusion. When it is desired to produce a catalyst for fluid bed operation, the calcined solid is ground to a powder which has an average particle size below at least 20 microns. Essentially all of the particles should be less than about 44 microns in diameter. A silica sol or a suspension of silica gel is then added to the powder to produce a free-flowing, pumpable liquid which can be spray dried. Water can be added to the slurry if necessary to reduce the viscosity to the optimum value for the spray drying operation.

(e) The dried and shaped catalyst particles are then subjected to a final calcination at least above about 800° F. but less than about 2000° F. preferably in a non-reducing or inert atmosphere such as air, nitrogen, helium, etc. Time, temperature, and the nature of the atmosphere under which the catalyst is calcined is generally selected on the basis of the activity desired in the specific catalytic process for which use is intended. In general, when the temperature is raised, the time of calcination extended and steam is provided in the heat treatment atmosphere, the resulting catalyst will be less catalytically active and possess a lower surface area.

Although the proportion of the active component to the silica carrier in the final catalyst composition is not critical, it is desirable that at least 50% by weight of the total attrition resistant catalyst be made up of active component, that is, the mixed antimony-other metal oxide. The active component can make up as much as 90% or more of the total catalyst although it is preferred to have at least 10% by weight of silica present and more preferably about 20% by weight of silica present.

The attrition resistance of the catalysts of this invention was determined in a number of tests and in each case a comparison was made between the attrition resistant catalysts embodied herein and the catalysts described in the aforementioned copending U.S. patent applications and the U.S. and British patents. Catalyst samples were compared in surface attrition by shaking on a 35 mesh screen for 60 minutes. A forty gram sample of the extruded heat treated catalyst having a particle size approximately 4 mm. in diameter and 5 to 6 mm. in length, was placed in a Cenco shaker at a setting of 7.

The weight percent of catalyst passing through the screen was used as the percent of attrition. The data obtained which are given in Table I show conclusively that the catalysts prepared in accordance with the process of this invention are more durable physically than those prepared by the conventional procedure. The antimony oxide-uranium oxide catalyst is an excellent example wherein only 2.5% of the catalyst prepared by the instant process was lost through attrition whereas 98.5% of the catalyst prepared by the conventional process was lost through attrition.

Fluid attrition of catalyst was determined by test methods described in the publication, "Test Methods for Synthetic Cracking Catalysts," American Cyanamid Company, 6/31–4m–1/57, page 42. The apparatus employed was designed to admit air through the openings of a perforated plate at sufficient velocity to cause jets of catalyst to be blown into the main bed of the catalyst at high velocity. The large upper section above the catalyst tube served as an elutriator-dust collector. As such, the particles with diameters over approximately 16 microns, depending somewhat on density of the particles and Stokes law, fall back and concentrate on the outer walls of the 5-inch diameter tube. There they become agglomerated into large enough aggregates to drop back into the catalyst bed. Particles with diameters smaller than 16 microns are carried over into a flask-thimble assembly that can be weighed at intervals to determine the amount of fines formed as a function of time.

A number of modifications of the foregoing test were employed. The time in the 45-hour method was reduced to 24 hours, and 50 grams of a catalyst sample containing no moisture were used. The weight of fines which came over was measured at the fourth hour and at the 24th hour and the incremental weight of fines between these two times was used. In a second test, the overall time was reduced to four hours, and 30 grams of the catalyst sample containing no added moisture were employed. The weight of fines that came over was measured at the first hour and the fourth hour; again, the incremental weight of fines between these two times was reported. The data presented in Table II show that the percent weight loss for the catalysts prepared according to the instant process was less than half the weight loss for the conventional preparations. Catalysts containing molybdenum, manganese, and tin were compared in the four hour test, and in these cases, attrition losses were twice as great for the catalysts prepared by the conventional process.

The compressive strength of catalysts described in the examples and in Table III was determined using the Tinius-Olsen tester. The average pressure at the point of failure was reported as the compressive strength of the given catalyst. Extruded catalyst particles were approximately 4 mm. in diameter and 5 to 6 mm. in length. It can be seen in the examples that the catalysts prepared in accordance with the present invention are stronger by a factor of at least 3 and that the majority of catalysts tested were 10 times stronger than those prepared in the conventional manner.

Finally, catalyst activity was determined to demonstrate that catalysts prepared according to the process of the instant invention, in addition to their attrition resistance, maintain their activity in the production of acrylonitrile, methacrylonitrile, acrolein or butadiene-1,3 as shown in Table IV. The catalysts were tested in micro, fixed bed and fluid bed units. Some of these experiments were compared with those employing catalysts prepared according to the conventional methods. The data in the examples demonstrate well that the catalysts prepared by the instant process were equally as active for the foregoing reactions as were those prepared by the conventional method.

The products and processes of this invention are further illustrated in the following examples wherein the amounts of the various ingredients are expressed as parts by weight unless otherwise indicated.

EXAMPLE I (A) A 60% by weight antimony oxide-uranium oxide, 40% by weight SiO$_2$ catalyst having empirical formula USb$_{4.56}$O$_{11.79}$ was prepared as follows: 45 grams of antimony metal which passed an 80 mesh screen were completely oxidized in 180 mls. of hot, concentrated nitric acid (specific gravity 1.42). 40.7 grams of $$UO_2(NO_3)_2 \cdot 6H_2O$$

were then added and the mixture was evaporated almost to dryness. The mixture was then diluted with 176 grams of Du Pont H-S Ludox, which is an aqueous silica sol containing 30% by weight of silica, and enough distilled water for rinsing. Then 28% NH$_4$OH was added to obtain a pH of 8.0 for the mixture. The insoluble portion was removed by filtration and washed with 600 mls. of distilled water divided into three portions. The material was stirred vigorously and then was extruded using a cake decorator. The extrudate was air dried for four hours and then for 15 hours at 120° C. The extrudate was then calcined at 800° F. for 24 hours and heat treated at 1650° F. for 8 hours.

When the foregoing experiment was repeated using a 16 hour heat treatment at 1650° F. in the last step, the resulting catalyst was no more attrition resistant than the catalyst which received the 8 hour treatment.

(B) A 60% by weight antimony oxide-uranium oxide, 40% by weight SiO$_2$ catalyst having an active component empirical formula of USb$_{4.56}$O$_{11.79}$ was prepared in accordance with the process of this invention as follows: 45 grams of antimony metal which passed an 80 mesh screen were completely oxidized in 180 mls. of hot, concentrated nitric acid of 1.42 specific gravity. 40.7 grams of UO$_2$(NO$_3$)$_2$·6H$_2$O were added and the mixture was evaporated almost to dryness. Then 88 grams of Du Pont Ludox H-S aqueous silica sol and enough distilled water for rinsing were added. 28% NH$_4$OH was added to bring the mixture to a pH of 8.0. The resulting precipitate was removed by filtration and the filtrate was washed with 600 mls. of distilled water in three portions. The material was then dried at 120° C. for 15 hours. The material then was calcined at 800° F. for 24 hours, followed by heat treatment at 1650° F. for 8 hours.

The catalyst was then ground so that it passed through a 170 mesh screen and then was mixed vigorously with 88 grams of Du Pont H-S Ludox. The resulting paste was then extruded using a cake decorator. The extrudate was dried in air for four hours and then at 120° C. for 15 hours. Finally, the extrudate was heat treated at 1650° F. for 8 hours.

A repeat of (B) above wherein no aqueous silica sol was used in the first step and 176 grams of silica sol were used with the ground catalyst produced a final catalyst which had substantially the same physical properties as that prepared by (B) procedure and it had equal activity in the synthesis of acrylonitrile, acrolein and butadiene-1,3.

EXAMPLE II (A) A catalyst composed of 70% by weight of antimony oxide-iron oxide and 30% by weight of SiO$_2$ wherein the empirical formula of the active component was FeSb$_{8.63}$O$_{14.42}$ was prepared as follows: 45 grams of antimony metal which passed an 80 mesh screen were completely oxidized in 180 mls. of hot, concentrated nitric acid of specific gravity 1.42. 17.2 grams of $$Fe(NO_3)_3 \cdot 9H_2O$$

were added and the mixture was evaporated almost to dryness. The mixture was then diluted with 86 grams of a 30% aqueous silica sol and enough distilled water for rinsing. Then 28% NH$_4$OH was added to bring the mixture to a pH of 8.0. The resulting precipitate was isolated by filtration and was washed with 600 mls. of distilled water in three portions. The material was stirred vigorously and then was extruded using a cake decorator. The extrudate was dried in air for four hours and at 120° C. for 15 hours. The extrudate was then calcined at 800° F. for 24 hours and heat treated at 1400° F. for 8 hours.

(B) A catalyst having the same chemical composition as that of (A) above was prepared in accordance with the present invention as follows: 45 grams of antimony metal which was fine enough to pass through an 80 mesh screen were completely oxidized in 180 mls. of hot, concentrated nitric acid of 1.42 specific gravity. 17.2 grams of Fe(NO$_3$)$_3$·9H$_2$O were added and the mixture was evaporated nearly to dryness. Then 43 grams of a 30% aqueous silica sol and enough distilled water for rinsing were added. 28% NH$_4$OH was then added to obtain a pH of 8.0. The resulting precipitate was isolated by filtration and the filtrate was washed with 600 mls. of distilled water in three portions. The material was dried at 120° C. for 15 hours, calcined at 800° F. for 24 hours, and heat treated at 1400° F. for 8 hours.

The material was then ground so that it passed through a 170 mesh screen and then was mixed vigorously with 43 grams of a 30% aqueous silica sol. This paste was then extruded using a cake decorator. The extrudate was air dried for four hours and then at 120° C. for 15 hours. Finally, the extrudate was heat treated at 1400° F. for 8 hours.

EXAMPLE III (A) A catalyst composed of 70% by weight of antimony oxide-thorium oxide and 30% by weight of SiO$_2$ wherein the active component had the empirical formula ThSb$_{5.73}$O$_{10.47}$ was prepared as follows: 45 grams of antimony metal which was of sufficient fineness to pass through an 80 mesh screen were completely oxidized in 180 mls. of hot, concentrated nitric acid of 1.42 specific gravity. 35.8 grams of Th(NO$_3$)$_4$·4H$_2$O were added and the mixture was evaporated nearly to dryness. The mixture was then diluted with 105 grams of a 30% by weight aqueous silica sol and enough distilled water for rinsing. Then 28% NH$_4$OH was added to bring the mixture to a pH of 8.0. The precipitate was isolated by filtration and was washed with 600 mls. of distilled water in three portions. The material was stirred vigorously and then extruded using a cake decorator. The extrudate was dried in air for four hours and at 120° C. for 15 hours. The extrudate was then calcined at 800° F. for 24 hours and heat treated at 1400° F. for 8 hours.

(B) A catalyst having the same composition as that of the catalyst described in (A) of this example was prepared in accordance with the present invention as follows: 45 grams of antimony metal fine enough to pass through an 80 mesh screen were completely oxidized in 180 mls. of hot, concentrated nitric acid of 1.42 specific gravity. 35.8 grams of Th(NO$_3$)$_4$·4H$_2$O were added and the mixture was evaporated almost to dryness. Then 52.5 grams of a 30% by weight silica sol and enough distilled water for rinsing were added. 28% NH$_4$OH was added to bring the pH of the mixture to 8.0. The precipitate was isolated by filtration and the precipitate was washed with 600 mls. of distilled water in three portions. The material was dried at 120° C. for 15 hours, calcined at 800° F. for 24 hours, and heat treated at 1400° F. for 8 hours.

The material was then ground to pass through a 170 mesh screen and then mixed vigorously with 52.5 grams of 30% aqueous silica sol. The resulting paste was then extruded using a cake decorator. The extrudate was dried in air for four hours and then at 120° C. for 15 hours. Finally the extrudate was heat treated at 1400° F. for 8 hours.

EXAMPLE IV (A) A catalyst composed of 70% by weight of antimony oxide-cerium oxide and 30% by weight of SiO$_2$ wherein the active component had the empirical formula $CeSb_{3.45}O_{7.17}$ was prepared as follows: 45 grams of antimony metal of 80 mesh size or smaller were completely oxidized in 180 mls. of hot, concentrated nitric acid of 1.42 specific gravity. 59.0 grams of $(NH_4)_2Ce(NO_3)_6$ were added and the mixture was evaporated almost to dryness. The mixture was then diluted with 107.3 grams of a 30% aqueous silica sol and enough distilled water for rinsing. Then 28% $NH_4OH$ was added until a pH of 8.0 was reached. The insoluble portion was then isolated by filtration and was washed with 600 mls. of distilled water in three separate portions. The material was stirred vigorously and was then extruded using a cake decorator. The extrudate was dried in air for four hours and at 120° C. for 15 hours. The extrudate was then calcined at 800° F. for 24 hours and heat treated at 1400° F. for 8 hours.

(B) A catalyst having the same chemical composition as that of (A) of this example was prepared in accordance with the present invention as follows: 45 grams of antimony metal of 80 mesh or smaller size were completely oxidized in 180 mls. of hot, concentrated nitric acid of 1.42 specific gravity. 59 grams of $$(NH_4)_2Ce(NO_3)_6$$

were added and the resulting mixture was evaporated nearly to dryness. Then 53.7 grams of an aqueous 30% silica sol and enough distilled water for rinsing were added. Sufficient 28% $NH_4OH$ was added to bring the pH of the mixture to 8.0. The solid was then isolated from the mixture by filtration and was washed with 600 mls. of distilled water in three separate portions. The material was dried at 120° C. for 15 hours, calcined at 800° F. for 24 hours, and heat treated at 1400° F. for 8 hours.

The dry, solid material was then ground to pass through a 170 mesh screen and then was mixed vigorously with 53.7 grams of an aqueous 30% silica sol. The resulting paste was then extruded using a cake decorator. The extrudate was dried in air for four hours and then at 120° C. for 15 hours. Finally the extrudate was heat treated at 1400° F. for 8 hours.

EXAMPLE V (A) A catalyst composed of 70% by weight of antimony oxide-molybdenum oxide and 30% by weight of $SiO_2$ wherein the active component had the empirical formula $MoSb_{2.36}O_{6.54}$ was prepared as follows: 45 grams of antimony metal sufficiently small to pass through an 80 mesh screen were completely oxidized in 180 mls. of hot, concentrated nitric acid of 1.42 specific gravity. 113.3 grams of an aqueous 30% silica sol were added and the mixture was brought to a pH of 8.0 by the addition of 28% $NH_4OH$. The solid material in the resulting mixture was isolated by filtration and was washed with 600 mls. of distilled water in three separate portions. A solution of 27.6 grams of $(NH_4)_6Mo_7O_{24}\cdot 4H_2O$ dissolved in 70 mls. of distilled water was added to the mixture. This material was stirred vigorously and then extruded using a cake decorator. The extrudates were dried in air for four hours, at 120° C. for 15 hours, calcined at 800° F. for 24 hours and heat treated at 1400° F. for 8 hours.

(B) A catalyst having the same chemical composition as that of (A) of this example was prepared in accordance with the present invention as follows: 45 grams of finely divided antimony metal which passed through an 80 mesh screen were completely oxidized in 180 mls. of hot, concentrated nitric acid having a specific gravity of 1.42. 56.6 grams of an aqueous 30% silica sol were added and the mixture was brought to a pH of 8.0 by the addition of 28% $NH_4OH$. The solid material was isolated from the resulting mixture and was washed with 600 mls. of distilled water in three portions. A solution of 27.6 grams of $(NH_4)_6Mo_7O_{24}\cdot 4H_2O$ dissolved in 70 mls. of distilled water was added to the mixture. The material was then dried at 120° C. for 15 hours, calcined at 800° F. for 24 hours, and heat treated at 1400° F. for 8 hours.

The solid material was then ground to pass through a 170 mesh screen and was mixed vigorously with 56.6 grams of an aqueous 30% silica sol. The resulting paste was extruded using a cake decorator. The extrudate was dried in air for four hours and at 120° C. for 15 hours. Finally, the extrudate was heat treated at 1400° F. for 8 hours.

EXAMPLE VI (A) A catalyst composed of 70% by weight of antimony oxide-manganese oxide and 30% by weight of $SiO_2$ wherein the active component had the empirical formula $MnSb_{1.35}O_{4.02}$ was prepared as follows: 45 grams of finely divided antimony metal of 80 mesh or smaller size were completely oxidized in 180 mls. of hot, concentrated nitric acid having a specific gravity of 1.42. 98 grams of a 50% aqueous solution of $Mn(NO_3)_2$ were added and the resulting mixture was evaporated almost to dryness. The mixture was then diluted with 109 grams of an aqueous 30% silica sol and enough distilled water for rinsing. Then 28% $NH_4OH$ was added to the mixture to bring the pH to 8.0 The solid material in the mixture was isolated by filtration and was washed with 600 mls. of distilled water in three portions. The mixture was stirred vigorously and then was extruded using a cake decorator. The extrudate was dried in air for four hours and at 120° C. for 15 hours. The extrudate was then calcined at 800° F. for 24 hours and heat treated at 1400° F. for 8 hours.

(B) A catalyst having the same chemical composition as that of (A) of this example was prepared in accordance with the present invention as follows: 45 grams of 80 mesh antimony metal were completely oxidized in 180 mls. of hot, concentrated nitric acid having a specific gravity of 1.42. 98 grams of a 50% solution of $Mn(NO_3)_2$ were added and the mixture was then evaporated nearly to dryness. Then 54.5 grams of an aqueous 30% silica sol and enough distilled water for rinsing were added. 28% $NH_4OH$ was added to bring the pH of the mixture to 8.0 The solid portion of the resulting mixture was isolated by filtration and was washed with 600 mls. of distilled water in three portions. The solid was dried at 120° C. for 15 hours, calcined at 800° F. for 24 hours, and heat treated at 1400° F. for 8 hours.

The material was ground to pass through a 170 mesh screen and then mixed vigorously with 54.5 grams of an aqueous 30% silica sol. The resulting paste was then extruded using a cake decorator. The extrudate was dried in air for four hours and then at 120° C. for 15 hours. Finally, the extrudate was heat treated at 1400° F. for 8 hours.

EXAMPLE VII (A) A catalyst composed of 70% by weight of antimony oxide-tin oxide and 30% by weight of $SiO_2$ wherein the active component had the empirical formula $SbSn_{1.80}O_{5.09}$ was prepared as follows: 45 grams of tin metal were oxidized in a solution of 189 mls. of concentrated nitric acid of 1.42 specific gravity and 757 mls. of distilled water. Also 23.1 grams of 80 mesh antimony metal were oxidized in 95 mls. of concentrated nitric acid. The two oxide mixtures were then combined and 112.3 grams of an aqueous 30% silica sol were added. The pH of the resulting mixture was then adjusted to 8.0 with 28% $NH_4OH$. The solid portion of the resulting mixture was isolated by filtration and was washed with 600 mls. of distilled water in three portions. The paste was then extruded through a cake decorator. The extrudate was dried in air for four hours, dried at 120° C. for 15 hours, calcined at 800° F. for 24 hours, and heat treated at 1830° F. for 8 hours.

(B) A catalyst having the same chemical composition as that of (A) of this example was prepared in accordance with the present invention as follows: 45 grams of tin metal were oxidized in a solution of 189 mls. of concentrated nitric acid of 1.42 specific gravity and 757 mls. of distilled water. Also 23.1 grams of 80 mesh antimony metal were oxidized in 95 mls. of concentrated nitric acid. The two metal oxide mixtures and 56.2 grams of an aqueous 30% silica sol were combined. Sufficient 28% NH$_4$OH was then added to the mixture to bring the pH to 8.0. The solid material was isolated by filtration and was washed with 600 mls. of distilled water in three portions. The solid was then dried at 120° C. for 15 hours, calcined at 800° F. for 24 hours and heat treated at 1830° F. for 8 hours.

The material was then ground to pass through a 170 mesh screen and mixed vigorously with 56.2 grams of an aqueous 30% silica sol. The resulting paste was then extruded using a cake decorator. The extrusions were dried in air for four hours and at 120° C. for 15 hours. Finally, the extrusions were heat treated at 1830° F. for 8 hours.

*Table III.—Catalyst compressive strength comparison*

| Catalyst: | Average pressure at failure (lbs.) |
|---|---|
| Example I (A) | 1.4 |
| Example I (B) | 80.3 |
| Example II (A) | 9.1 |
| Example II (B) | 49.7 |
| Example III (A) | 2.2 |
| Example III (B) | 30.8 |
| Example IV (A) | 2.5 |
| Example IV (B) | 75.6 |
| Example V (A) | 14.7 |
| Example V (B) | 52.6 |
| Example VI (A) | 4.1 |
| Example VI (B) | 78.8 |
| Example VII (A) | 16.8 |
| Example VII (B) | 48.8 |

*Table IV*

| Catalyst | Feed | Reactant Mole Ratios | | | | Contact Time (Sec.) | Reaction Temp., °F. | Product Conversion | Reactor |
|---|---|---|---|---|---|---|---|---|---|
| | | Olefin | NH$_3$ | Air | H$_2$O | | | | |
| Example II (A) | Propylene | 1 | 1 | 12 | | 3 | 875 | 50.7 Acrylonitrile | Micro Unit. |
| Example II (B) | ___do___ | 1 | 1 | 12 | | 3 | 875 | 54.4 Acrylonitrile | Do. |
| Example I (B) | ___do___ | 1 | 1 | 12 | | 3 | 875 | 75.6 Acrylonitrile | Do. |
| Do | Isobutene | 1 | 1 | 21 | | 8 | 850 | 66.3 Methacrylonitrile | Fluid Bed. |
| Do | Propylene | 1 | | 8 | 4 | 3.5 | 850 | 64.1 Acrolein | Fixed Bed. |
| Example II (B) | Butene-1 | 1 | | 10 | | 6 | 850 | 82.1 Butadiene-1,3 | Do. |
| Do | Cis-butene-2 | 1 | | 10 | | 6 | 850 | 57 Butadiene-1,3 | Do. |

*Table I*

| Catalyst: | Wt. percent fines produced [1] |
|---|---|
| Example I (A) | 98.5 |
| Example I (B) | 2.5 |
| Example II (A) | 76.0 |
| Example II (B) | 2.0 |
| Example III (A) | 92.3 |
| Example III (B) | 10.8 |
| Example IV (A) | 96.8 |
| Example IV (B) | 8.8 |
| Example V (A) | 48.0 |
| Example V (B) | 3.0 |
| Example VI (A) | 79.8 |
| Example VI (B) | 1.5 |
| Example VII (A) | 8.3 |
| Example VII (B) | 3.0 |

[1] Test conditions: 40 gram sample (4 mm. x 5 to 6 mm. extrusions) placed on a 35 mesh screen and shaken for exactly 60 minutes at a setting of 7 on a Cenco shaker.

*Table II*

STANDARD FLUID ATTRITION TEST

| Catalyst | Percent Weight Loss in— | | |
|---|---|---|---|
| | 1st 5 Hrs. | Addnl. 19 Hrs. | 24 Hr. Total |
| Example I (A) | 13.6 | 4.0 | 17.6 |
| Example I (B) | 5.0 | 3.3 | 8.3 |

MODIFIED FLUID ATTRITION TEST

| Catalyst | First Hour | Addnl. 3 Hrs. | 4 Hr. Total |
|---|---|---|---|
| Example V (A) | 25.14 | 8.57 | 33.71 |
| Example V (B) | 9.71 | 1.71 | 11.42 |
| Example VI (A) | 15.91 | 8.52 | 24.43 |
| Example VI (B) | 10.00 | 2.22 | 12.22 |
| Example VII (A) | 15.71 | 3.43 | 19.14 |
| Example VII (B) | 4.67 | 2.66 | 7.33 |

We claim:
1. The process for preparing an attrition resistant solid oxidation catalyst comprising the steps of
   (A) activating at a temperature of from about 1000° F. to about 2000° F. in an oxidizing atmosphere an oxidation catalyst per se or said catalyst on a carrier said catalyst consisting essentially of the combined oxides of the metals antimony and M wherein M is at least one metal selected from the group consisting of uranium, iron, manganese, thorium, cerium, molybdenum and tin and reducing the resulting catalyst to a fine powder and
   (B) mixing the powder from (A) with an aqueous silica sol, drying and heat treating the resulting mixture at a temperature of from about 750° F. to about 2000° F.

2. The process of claim 1 wherein the antimony: M atomic ratio is from 1:50 to about 99:1.

3. The process of claim 2 wherein the aqueous silica sol contains from about 5 to 90% by weight of silica.

4. The process of claim 3 wherein the heat treating step of (B) is done in a non-reducing atmosphere.

5. The process of claim 4 wherein the final catalyst contains from about 10 to 50% by weight of silica.

6. The attrition resistant catalyst prepared by the process of claim 1 said catalyst being further characterized as having a compressive strength greater than thirty pounds at failure as determined on particles of said catalyst which are about 4 mm. in diameter and 5 to 6 mm. in length.

7. The process of claim 5 wherein M is uranium.
8. The process of claim 5 wherein M is iron.
9. The process of claim 5 wherein M is manganese.
10. The process of claim 5 wherein M is thorium.
11. The process of claim 5 wherein M is cerium.
12. The process of claim 5 wherein M is molybdenum.
13. The process of claim 5 wherein M is tin.

14. The attrition resistant catalyst produced by the process of claim 5 said catalyst being further characterized as having a compressive strength greater than thirty pounds at failure as determined on particles of said catalyst which are about 4 mm. in diameter and 5 to 6 mm. in length.

References Cited

UNITED STATES PATENTS

| | | | |
|---|---|---|---|
| 2,904,580 | 9/1959 | Idol | 260—601 |
| 3,197,419 | 7/1965 | Callahan et al. | 252—456 |
| 3,198,750 | 8/1965 | Callahan et al. | 252—456 |
| 3,200,081 | 8/1965 | Callahan et al. | 252—456 |
| 3,200,084 | 8/1965 | Callahan et al. | 252—456 |

FOREIGN PATENTS 876,446　8/1961　Great Britain.

OSCAR R. VERTIZ, *Primary Examiner.*

H. S. MILLER, *Assistant Examiner.*